United States Patent
Holzinger

(10) Patent No.: US 10,698,303 B2
(45) Date of Patent: Jun. 30, 2020

(54) PROJECTION APPARATUS FOR PRODUCING A PIXEL-BASED ILLUMINATION PATTERN

(71) Applicant: CONTINENTAL AUTOMOTIVE GMBH, Hannover (DE)

(72) Inventor: Stefan Holzinger, Vienna (AT)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 16/144,211

(22) Filed: Sep. 27, 2018

(65) Prior Publication Data
US 2019/0094668 A1    Mar. 28, 2019

(30) Foreign Application Priority Data

Sep. 27, 2017  (DE) .................. 10 2017 217 164

(51) Int. Cl.
| G03B 21/00 | (2006.01) |
| --- | --- |
| H04N 9/31 | (2006.01) |
| G02B 27/09 | (2006.01) |
| G02B 27/34 | (2006.01) |
| G02B 26/08 | (2006.01) |

(Continued)

(52) U.S. Cl.
CPC .......... *G03B 21/008* (2013.01); *F21S 41/00* (2018.01); *F21S 41/32* (2018.01); *G02B 26/0833* (2013.01); *G02B 27/0927* (2013.01); *G02B 27/0977* (2013.01); *G02B 27/106* (2013.01); *G02B 27/34* (2013.01); *G03B 21/2033* (2013.01); *H04N 9/3102* (2013.01);

(Continued)

(58) Field of Classification Search
CPC ......... G03B 21/00; G03B 21/20; F21S 41/32; G02B 27/09; G02B 27/10
See application file for complete search history.

(56) References Cited

U.S. PATENT DOCUMENTS

| 9,316,892 B2 | 4/2016 | Pretorius et al. |
| --- | --- | --- |
| 9,645,501 B2 | 5/2017 | Patra et al. |

(Continued)

FOREIGN PATENT DOCUMENTS

| DE | 102008011866 A1 | 9/2009 |
| --- | --- | --- |
| DE | 102010001945 A1 | 8/2011 |

(Continued)

OTHER PUBLICATIONS

Dennis F. Vanderwerf; Applied Prismatic and Reflective Optics; Year 2010; pp. 179-197; Spie Press.

*Primary Examiner* — Isiaka O Akanbi
*Assistant Examiner* — Danell L Owens
(74) *Attorney, Agent, or Firm* — Laurence A. Greenberg; Werner H. Stemer; Ralph E. Locher

(57) ABSTRACT

A projection apparatus for producing a pixel-based illumination pattern has a laser light source for producing coherent laser light and a micromirror array with a multiplicity of mirrors. The mirrors are implemented so as to be controllable in terms of their position, for setting a brightness and/or color of a respective pixel of the pixel-based illumination pattern. The laser light source emits the laser light towards the micromirror array. A beam-shaping element splits the laser light from the laser light source into a multiplicity of partial beams and each of the partial beams is oriented toward one of the mirrors of the micromirror array.

16 Claims, 3 Drawing Sheets

(51) Int. Cl.
*F21S 41/00* (2018.01)
*F21S 41/32* (2018.01)
*G02B 27/10* (2006.01)
*G03B 21/20* (2006.01)

(52) U.S. Cl.
CPC ......... *H04N 9/3144* (2013.01); *H04N 9/3152* (2013.01); *H04N 9/3161* (2013.01)

(56) References Cited

U.S. PATENT DOCUMENTS

| | | | | |
|---|---|---|---|---|
| 2002/0075914 A1* | 6/2002 | Koyanagi | ............... | H01S 5/146 372/36 |
| 2006/0256335 A1* | 11/2006 | Chen | .................... | G02B 5/3083 356/369 |
| 2010/0067086 A1* | 3/2010 | Khan | ....................... | G02B 5/12 359/239 |
| 2010/0073580 A1* | 3/2010 | Ritz | ....................... | G03B 21/26 348/745 |
| 2011/0188017 A1 | 8/2011 | Horn et al. | | |
| 2014/0002514 A1* | 1/2014 | Richards | ............ | G02B 27/0905 345/691 |
| 2014/0254133 A1* | 9/2014 | Kotter | .................... | C09K 11/02 362/84 |
| 2015/0124466 A1 | 5/2015 | Kushimoto | | |
| 2016/0004219 A1 | 1/2016 | Leister et al. | | |
| 2016/0011493 A1* | 1/2016 | Okumura | ............. | H04N 9/3161 353/31 |
| 2016/0327235 A1* | 11/2016 | Khrushchev | ............ | F21V 5/008 |
| 2018/0149327 A1* | 5/2018 | Hechtfischer | ...... | G02B 26/0833 |
| 2018/0259156 A1* | 9/2018 | Hechtfischer | ...... | G03B 21/2013 |

FOREIGN PATENT DOCUMENTS

| | | |
|---|---|---|
| DE | 102012217329 A1 | 6/2014 |
| DE | 102015110502 A1 | 1/2016 |
| WO | 2013131834 A1 | 9/2013 |

\* cited by examiner

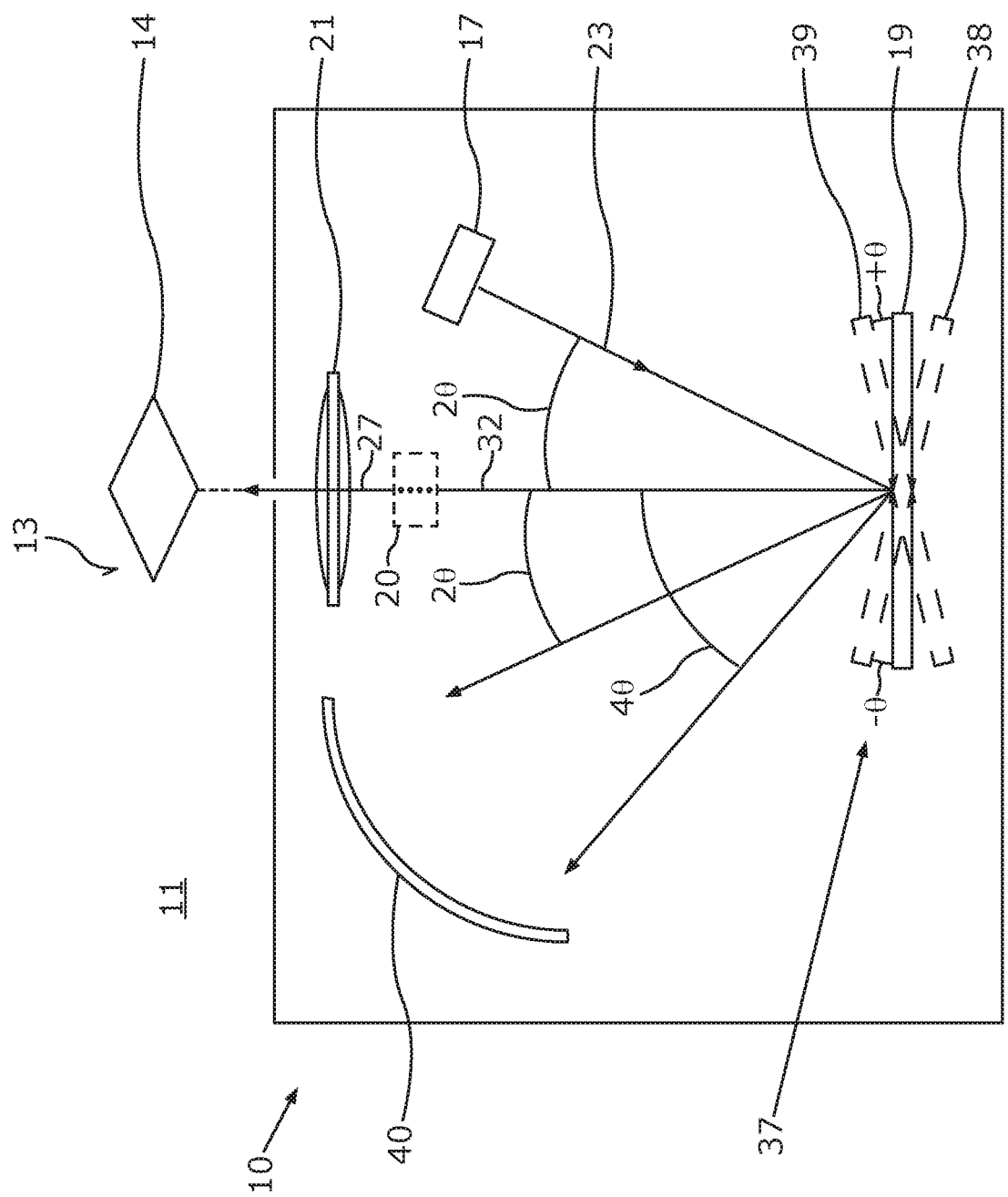

PROJECTION APPARATUS FOR PRODUCING A PIXEL-BASED ILLUMINATION PATTERN

CROSS-REFERENCE TO RELATED APPLICATION

This application claims the priority, under 35 U.S.C. § 119, of German patent application DE 10 2017 217 164.2, filed Sep. 27, 2017; the prior application is herewith incorporated by reference in its entirety.

BACKGROUND OF THE INVENTION

Field of the Invention

The invention relates to a projection apparatus for producing a pixel-based illumination pattern. The illumination pattern can be projected onto a projection surface, where it can then be perceived or seen as a light phenomenon by a user. Individual image elements, or pixels (picture element), of the illumination pattern can be individually set or specified. The projection apparatus may, for example, be a headlamp of a motor vehicle or a projector for image reproduction.

To set the brightness and/or color of a respective pixel of an illumination pattern, a projection apparatus can have a micromirror array. Another name for it is digital micromirror device (DMD). This is an arrangement of a multiplicity of mirrors which are embodied in the form of a so-called MEMS (microelectromechanical system). The mirrors make up a two-dimensional array or field. The inclination or tilt position or generally position of each mirror can be individually controlled or set. If light is shone onto a micromirror array, it is possible with each mirror to establish individually for a respective pixel of a pixel-based illumination pattern whether said pixel is irradiated with light (bright position of the mirror) or whether the light is diverted by tilting the mirror and is deflected, for example, into a light-swallowing surface and absorbed here (dark position of the mirror). If the projection apparatus is in the form of a headlamp, a bright pixel leaves the headlamp by way of the projection device, while in the case of a dark pixel the light disappears within the headlamp in a light sink.

During the lighting of a micromirror array, light is lost, because there is provided an intermediate space between the mirrors in each case that does not reflect but absorbs the light, for example due to a black coloration. As a result, the micromirror array is heated, which in turn makes necessary laborious cooling thereof. For the conventional distances between mirrors of a micromirror array, typically more than 10 percent of the light is lost in the intermediate spaces between the mirrors. The total efficiency of a micromirror array is typically specified as less than 70 percent for irradiation with non-coherent light (for example light from a light-emitting diode arrangement).

If this loss is intended to be compensated by the use of more light, this in turn also results in greater heating of the micromirror array. Moreover, micromirror arrays do not tolerate high temperatures, because, starting from about 65 degrees Celsius, they must be moved without interruption so as to prevent the mirrors from sticking. One cooling option is to briefly switch off the light source, but this in turn results in a decrease in the average brightness. Active cooling on the basis of a Peltier element is too expensive for the production.

SUMMARY OF THE INVENTION

It is accordingly an object of the invention to provide a high-efficiency projection apparatus which overcomes the above-mentioned and other disadvantages of the heretofore-known devices and methods of this general type.

With the foregoing and other objects in view there is provided, in accordance with the invention, a projection apparatus for producing a pixel-based illumination pattern, the projection apparatus comprising:

a laser light source for producing coherent laser light;

a micromirror array with a multiplicity of mirrors, the mirrors being configured for controlling a position thereof for setting a brightness and/or color of a respective pixel of the pixel-based illumination pattern;

the laser light source being configured to emit the laser light onto the micromirror array; and a beam-shaping element configured to split the laser light from the laser light source into a multiplicity of partial beams, which are each oriented toward one of the mirrors of the micromirror array.

In other words, there is provided a projection apparatus for producing a pixel-based projection image or illumination pattern. The projection apparatus has a laser light source for producing coherent laser light. Also provided is a micromirror arrangement, or a micromirror array (DMD element, micromirror device), which has a multiplicity of mirrors that are designed to be controllable in terms of their position. The brightness and/or color of a respective pixel of the pixel-based illumination pattern can be set by way of the mirrors of the micromirror array. To this end, the mirrors can be switched in each case between a bright position and a dark position. In the bright position, the light that is reflected by the respective mirror is radiated out of the projection apparatus. In the dark position, the light that is reflected by the respective mirror is projected into a region or into an absorber element in the projection apparatus, in which the reflected light is absorbed or swallowed or converted to heat and consequently no longer exits the projection apparatus. The lighting intensity of a light point can be modulated by alternating the bright position and the dark position (on/off). This is also called PWM (pulse width modulation): the longer the bright position lasts in relation to the dark position, the brighter is the pixel. The period duration of the PWM is here preferably shorter than 100 ms, preferably shorter than 30 ms. The laser light source is set up to emit the laser light onto the micromirror array. Consequently, the mirrors of the micromirror array are irradiated with the laser light.

To make operation of the projection apparatus more efficient, heating of the micromirror array, as could occur due to the laser light of the laser light source, is reduced. Provided for this purpose is a beam-shaping element, which is set up to split the laser light from the laser light source into a multiplicity of partial beams, of which each is oriented toward one of the mirrors of the micromirror array. In other words, each partial beam strikes a different one of the mirrors. As a result, each of the mirrors is irradiated individually by one of the partial beams. To this end, the beam-shaping element is arranged in the beam passage or beam path between the laser light source and the micromirror array.

The invention offers the advantage that each of the partial beams can be individually oriented toward one of the mirrors. Consequently, there is no need to radiate white light indiscriminately onto the entire arrangement of the mirrors, as a result of which light would also reach the intermediate spaces between the mirrors. Rather, by orienting the partial beams, the irradiance between the mirrors, that is to say in the intermediate spaces or gaps between the mirrors, can be lower, or can be preset to be lower, than on the mirrors themselves. Coherent laser light can be shaped significantly more easily due to the coherence, because interferences can be utilized. Owing to various frequencies (mixture of all colors), white light is non-coherent. The formation of the partial beams consequently reduces heating of the micromirror array by light that is absorbed in the intermediate spaces between the mirrors.

Owing to the formation of the partial beams, the beam-shaping element is preferably furthermore set up to use the partial beams to produce a dot pattern or spot pattern on the micromirror array, wherein in each case one light point or light spot is located on one of the mirrors of the micromirror array or is oriented toward it, and as a result, the irradiance on the mirrors is greater than in an intermediate space between the mirrors. In other words, each light point or light spot makes available the light that can be emitted or deflected by way of the respective mirror for a respective pixel of the pixel-based illumination pattern.

Before being split into the partial beams, the laser light from the laser light source can have an irradiance so great that dust and/or surfaces are burned and as a result light-blocking obstacles are produced. For this reason, a region between a laser of the laser light source and the beam-shaping element is preferably sealed to be dust-tight or air-tight. Hereby, said so-called dark locations or dark spots are prevented.

The beam-shaping element is preferably integrated in the laser light source. The integration makes adjustment easier. During installation of the projection apparatus, it is additionally possible to ensure that said region between the laser and the beam-shaping element remains sealed such that it is dust-tight or air-tight. The region which is sealed to be dust-tight or air-tight can preferably be evacuated, i.e. exhibit negative pressure with respect to ambient or atmospheric pressure of less than 1 bar, in particular less than 0.7 bar. Consequently, temperature-dependent pressure variations in the region which is sealed to be dust-tight or air-tight are decreased.

To split the laser light into said partial beams, the beam-shaping element for splitting the laser light into the partial beams in one embodiment has a photonic crystal and/or an optical grating. The splitting can consequently be effected on the basis of interference and/or refraction. Splitting light into partial beams is already known in principle. Reference is here made by way of example to the publication by Dennis F. Vanderwerf, "Applied Prismatic and Reflective Optics" (section 7.3 "Illuminators for Projection Displays," SPIE Press Monograph Series Vol. PM200, 2010).

In accordance with one embodiment, the beam-shaping element has an optical divergence structure for diverging the laser light and/or the partial beams. That means that the laser light and/or the partial beams can be diverged in the shape of a cone. Because of this, a greater surface area on the mirrors of the micromirror array can be lit than would be the case without a divergence structure. The divergence can be achieved, for example, by way of a two-dimensional structure, e.g. a notch and/or roughening, on a surface of a transparent substrate, for example a glass.

In accordance with one embodiment, the laser light source is set up to produce monochromatic laser light. The mirrors of the micromirror array here take the form of Bragg gratings. A Bragg grating can have an efficiency of more than 99.9 percent. To this end, the reflective surface can be provided with a coating by way of which, on the basis of interference (linear destructive, reflective constructive interference), the reflectance is increased as compared to a mirror without the coating. As a result, heating of the mirrors themselves can advantageously be reduced.

If monochromatic laser light is used, for one thing, the color of the illumination pattern is also prescribed. For the purpose of independence from the color and/or the coherence of the laser light, in one embodiment, a converter element is arranged in the beam passage or beam path downstream of the micromirror array. The converter element is set up to convert the laser light that is reflected by the micromirror array into light of the different color and/or white light. The micromirror array is set up to use the mirrors thereof to produce by reflection of the partial beams mutually independent luminous points on the converter element, of which each belongs to one of the pixels of the illumination pattern. In other words, this produces the optical path as follows: The laser light is guided out of the laser of the laser light source through the beam-shaping element to the micromirror array, and is reflected from here to the converter element. Luminous points form on the converter element at all locations at which a bright pixel is intended to appear in accordance with the illumination pattern. This in each case corresponds to one mirror in the bright position. The converted light which is emitted by the converter element can be projected onto a projection surface outside the projection apparatus, for example onto a wall or onto a projection screen or onto the ground, by way of an optical unit (e.g. at least one optical lens and/or a parabolic mirror). If the converter element is arranged like this in the beam path, it is advantageously possible to use coherent, monochromatic laser light for the formation of the partial beams.

The converter element can have phosphor for converting the laser light. Provision is made in particular for the combination of yellow phosphor and blue laser light. Irradiating the phosphor with laser light offers the advantage that white light can be produced with a luminosity that is sufficient to represent individual pixels in the illumination pattern with a specifiable minimum contrast. Additionally or alternatively to phosphor, a different material exhibiting the effect of phosphorescence may be provided.

The converter element can take the form, for example, of a transmitted-light element. This is for example a plate which is irradiated from one side with the reflected laser light by way of the micromirror array. On an opposite side, the luminous points form, which are emitted by way of said optical unit toward the outside into the area around the projection apparatus. However, it is preferred that the converter element has a converter layer that is arranged on a reflector, that is to say a layer with, for example, said phosphor. The reflector itself has a metal layer which is coupled to a cooling device of the projection apparatus. In other words, the laser light that is reflected by the micromirror array strikes that side of the converter element on which the converted light can also be emitted, e.g. in the direction of an optical unit of the projection apparatus. The other side, i.e. the rear side, has the reflector that can be cooled owing to its metal layer by way of the cooling device. The metal layer may be formed by a metal plate.

In accordance with one embodiment, the laser light source is set up to produce blue laser light. Blue laser light can advantageously be converted using yellow phosphor to form white light. For the color white, RGB (red green blue) is required, that is to say blue as well. The phosphor is preferably provided with a heat sink, for example having cooling fins.

In one embodiment, a deflection device is set up to deflect laser light from the laser light source that is oriented such that it travels past the micromirror array onto the micromirror array. As a result no light is "wasted," and even the light which is initially oriented such that it travels past the micromirror array is made usable for the micromirror array. A variant with more than one partial beam per mirror can also be provided hereby.

The deflection device here is preferably set up to deflect the laser light, by way of its deflection, only onto mirrors of the micromirror array that are situated in a predetermined peripheral region outside the center of the micromirror array. In other words, the deflected light is not indiscriminately deflected to all mirrors, but only to mirrors within the peripheral region. In this way, vignetting of the illumination pattern, that is to say darkening in the peripheral region, can be reduced. The deflection of the light can be effected in the deflection device on the basis of mirrors and/or refraction and/or diffraction of the light. By way of example, reflective surfaces can be arranged around the micromirror array.

The projection apparatus can have various implementations. In one embodiment, the projection apparatus is designed as a headlamp for a motor vehicle. This provides the advantage that the headlamp light of the motor vehicle can have said illumination pattern. It is possible hereby for example for notifications for a driver of the motor vehicle and/or another road user to be projected onto a road and/or onto an object in the vicinity of the motor vehicle.

The projection apparatus in accordance with a further embodiment can take the form of a multicolor projector. For example, the projection apparatus can be an RGB projector (RGB—red green blue). The projection apparatus can be provided as a multi-color projector for image reproduction, for example as an image projector or video projector.

The described setup can, of course, also be present in multiples, that is to say a plurality of laser light sources and/or a plurality of micromirror arrays may be provided. This is advantageous for example for a multicolor illumination pattern, as may be provided for image reproduction.

Other features which are considered as characteristic for the invention are set forth in the appended claims.

Although the invention is illustrated and described herein as embodied in a projection apparatus for producing a pixel-based illumination pattern, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a schematic side view of the micromirror array to illustrate a bright position and a dark position of a mirror of the micromirror array.

In the figures, elements having equal functions are in each case provided with the same reference numerals.

DETAILED DESCRIPTION OF THE INVENTION

Figure 1:
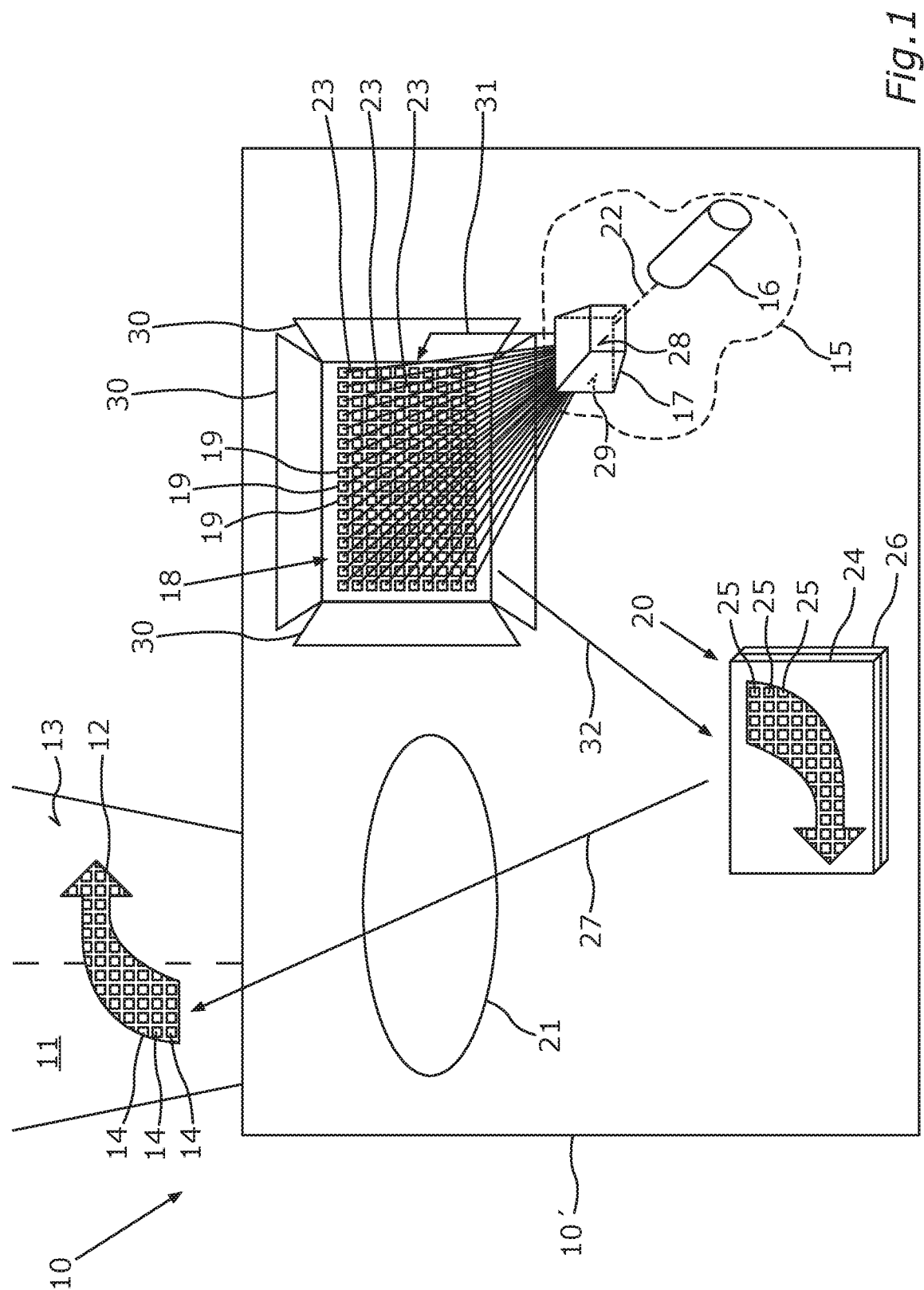
FIG. 1 shows a schematic illustration of an embodiment of the projection apparatus according to the invention.

Referring now to the figures of the drawing in detail and first, particularly, to FIG. 1 thereof, there is shown an exemplary embodiment of a projection apparatus 10, which may take the form, for example, of a headlamp for a motor vehicle and/or of a projector for image production. The projection apparatus 10 can be used to project an illumination pattern 12 for example onto a projection surface 13, e.g. the ground, in particular a road, in a surrounding area 11. By way of example, the illumination pattern 12 can be a symbol for a driving notification of a driver of a motor vehicle, in which the projection apparatus 10 can be installed. The illumination pattern 12 can be pixel-based, that is to say can be composed of individual image elements or pixels 14. Of the pixels 14, only some are denoted with a reference sign for the sake of clarity.

To produce the illumination pattern 12, the projection apparatus 10 has a laser light source 15 with a laser 16 and a beam-shaping element 17, and a micromirror array 18 having adjustable mirrors 19, and a converter element 20, and an optical projection system 21. Those elements are arranged in a housing 10' of the projection apparatus 10.

The beam-shaping element 17 is integrated in the laser light source 15, or connected downstream of it. The laser 16 produces laser light 22, which can be for example monochromatic, e.g. blue, laser light. The laser light 22 from the laser 16 is split by the beam-shaping element 17 into partial beams 23, of which only some are provided with a reference sign for the sake of clarity. The partial beams 23 in each case strike one of the mirrors 19 of the micromirror array 18. For the sake of clarity, only some of the mirrors 19 exhibit a reference numeral. Depending on the current position or spatial position of the mirrors 19 of the micromirror array 18, they either do or do not reflect the laser light of the partial beams 23 in each case onto a converter layer 24 of the converter element 20, i.e. in the latter case, the reflected laser light or the reflected partial beam does not strike the converter layer 24. The converter layer 24 may for example have phosphor. At the respective point of incidence or region of incidence of a reflected partial beam, a respective luminous point 25 is formed on the converter layer 24, of which again only some are provided with a reference sign for the sake of clarity. This produces a small image of the illumination pattern 12 here of non-coherent, for example white, light, which is projected onto the projection surface 13.

The illustrated converter element 20 is reflective, that is to say the converter layer 24 can be arranged on a metal layer 26 of a reflector that reflects light which exits from this side of the converter layer 24, i.e. from the side or surface of the converter layer 24 that faces the metal layer 26, back into the converter layer 24. The metal layer 26 can additionally be adapted for cooling the converter layer 24 and be connected e.g. to a heat sink (not illustrated) of the projection apparatus 10. Converted light 27, which has been emitted by the converter element 20, can be projected by way of the projection system 21 into the surrounding area 11, where it produces the illumination pattern 12 on the projection surface 13. The projection system 21 can effect, for example, focusing ("sharpness adjustment").

The beam-shaping element 17 can effect, on one side 28, a divergence of the laser light 22, i.e. conical divergence of the laser light 22. On a second side 29, situated opposite the first side 28, a device or structure for splitting the laser light 22 into the partial beams 23 can be provided. The divergence is optional. The purpose of the divergence is to reduce the local intensity of the light and consequently reduce or avoid the above-described dark spot problem. With a reduced intensity, burning of elements of the normal atmosphere, e.g. dust, is also reduced.

If not all partial beams 23 can be oriented toward one of the mirrors 19, a deflection device 30 may be provided, by way of which partial beams 31 that are oriented such that they travel past the micromirror array 18 are guided back or deflected to the micromirror array 18. The deflection device 30 can be formed for example on the basis of reflective surfaces, e.g. a metal plate or at least one additional mirror. Laser light 32 that is reflected by the mirrors 19 has the color of the laser light 22, that is to say is blue light, for example. The converted light 27, on the other hand, can have a different color, e.g. the color white.

For a multicolored illumination pattern 12, the illustrated arrangement of laser light source 15, micromirror array 18 and converter element 20 can be implemented for example in triplicate, and respectively a color filter, for example for red, green and blue, can be provided. Alternatively, three colored lasers 16 can be provided and a converter element 20 can be dispensed with.

The projection system 21 can have, for example, at least one optical lens to image the luminous points 25 in focused or sharp fashion onto the projection surface 13.

Figure 2:
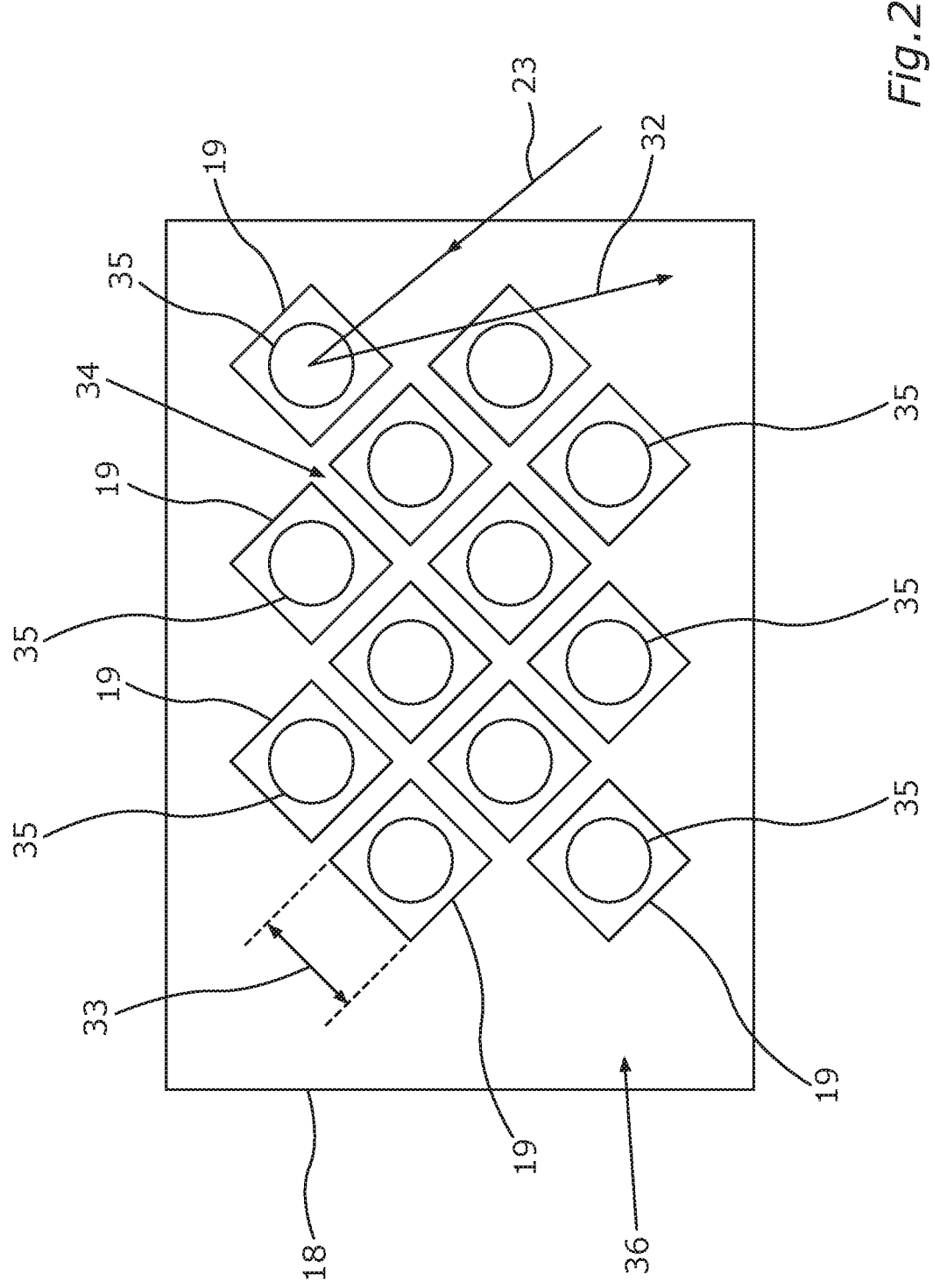
FIG. 2 is a schematic view of a micromirror array of the projection apparatus of FIG. 1.

FIG. 2 illustrates how heating of the micromirror array 18 is lower due to the splitting of the laser light 22 into the partial beams 23 than it would be with undirected, uniform irradiation of the micromirror array 18 with light.

A few of the mirrors 19 of the micromirror array 18 are illustrated. Each individual mirror 19 can be for example rectangular, in particular square, and have an edge length 33 that can range from 3 micrometers to 15 micrometers. Situated between the mirrors 19 is in each case a distance or gap or an intermediate space 34, in which the incident laser light of the partial beams 23 could not be reflected. For example, a black coating for absorbing the light may be arranged in each intermediate space 34. Since each partial beam 23 is oriented toward one of the mirrors 19, a luminous point or a light spot 35 is formed on each mirror 19, which is illustrated in FIG. 2 by way of example in detail for one mirror 19. In other words, a dot pattern 36 made of dots 35 is produced on the micromirror array 18 by way of the beam-shaping element 17, wherein each point or light point 35 is oriented toward one of the mirrors 19. Consequently, an illuminance in the intermediate spaces 34 is lower than on the surfaces of the mirrors 19 themselves. Consequently, less light needs to be absorbed in the intermediate spaces 34, as a result of which heating of the micromirror array 18 is decreased.

FIG. 3 illustrates how it is possible to specify for an individual pixel 14 of the illumination pattern 12 on the projection surface 13 in the surrounding area 11 whether it emits light or not. An individual partial beam 23 from the beam-shaping element 17 is for this purpose incident on one of the mirrors 19 of the micromirror array 18. For the mirror 19, a position 37 is switchable between a bright position 38 and a dark position 39. By way of example, angles are given as a multiple of a basic angle θ. In the bright position 38, the partial beam 23 is deflected or emitted by the converter element 20 and the projection system 21 into the surrounding area 11. A transmitted-light converter element 20 leaves the propagation direction unchanged, as is illustrated in FIG. 3. In the reflection converter element 20 that is illustrated in FIG. 1 an additional reflection takes place, but this is not illustrated in FIG. 3 for reasons of clarity. The two possible beam paths at the converter element 20 (reflected and not reflected) are symbolized in FIG. 3 by way of dots of an ellipsis. In the dark position 39, the partial beam 23 is deflected by the mirror 19 onto an absorber element 40 of the projection apparatus 10, where the light of the partial beam 23 is absorbed with the result that it does not pass into the surrounding area 11. The absorber element 40 can have a black coating for absorbing the light. As is illustrated in FIG. 3, if the micromirror array 18 is not supplied with current, the light beam may be located 28 to the left of the beam that is projected into the surrounding area. In the case of a "dark pixel," the light beam can be at 48.

The basic idea is thus that coherent laser light is used for shaping light and is converted only subsequently into white light using the converter element 20. For example, a blue laser 16 can be used, the laser light 22 of which is deflected via the mirrors 19 of the micromirror array 18 onto, for example, yellow phosphor of a converter element 20 to produce the white light 27. Using a beam-shaping element, for example a photonic crystal or another optical system, the laser light 22 is divided or split or shaped by an interference pattern in a manner such that in each case only the mirrors 19 rather than the distances or gaps or intermediate spaces 34 between the mirrors 19 (except for stray radiation) are illuminated. As a simplified model, a light point 35 (or a light spot) is formed in each case at the center of each mirror 19, wherein the intensity of the light points 35 is preferably the same. If the peripheral regions of the bundle of partial beams 23 are greater than the micromirror array 18, these beams 31 can be reflected back into the region of the micromirror array 18 by way of the deflection device 30 and in this way also counteract for example vignetting of the illumination pattern 12.

To produce the dot pattern 36 due to the partial beams 23, a two-dimensional structure can be provided for example on one side 29 of a substrate, for example of a glass of the beam-shaping element 17. An optional divergence of the laser beam of the laser light 22 can be effected by a second two-dimensional structure on a side 28 of the substrate that is opposite the side 29. The side 28 can be the light entry side and the side 29 can be the light exit side for the laser light 22 at the beam-shaping element 17.

A preferred embodiment is the integration of the beam-shaping element 17 in the laser light source 15, which both simplifies adjustment and attenuates the described dark spot problem, because in a closed system of the laser light source 15, there are fewer particles which may burn or become burned in.

It is of course also possible for in each case one laser 16 to illuminate only a portion of the entire mirrors 19, wherein it is to be irrelevant by which division this is to take place, that is to say for example by spatial alternation (illuminating in stripes or rectangles) or temporal alternation (taking turns in intervals). By providing a plurality of lasers 16 for irradiating a micromirror array 18, the luminous output or luminance for the illumination pattern 12 can be increased.

By using coherent laser light 22, a smaller and consequently more cost-effective micromirror array 18 can be used for shaping light than in the case of non-coherent light. A smaller micromirror array 18 is also more easily formable than a larger one. The micromirror array 18 is heated less, because the spaces or distances or intermediate spaces 34 between the mirrors 19 are not illuminated. These are coated black to absorb stray light, which would result in increased absorption and consequently heating. The mirrors 19 can be provided with coatings in order to more efficiently reflect the coherent laser light 22. By way of example, each mirror 19 can take the form of a Bragg grating, wherein a Bragg reflection with an efficiency of more than 99.9 percent is possible. The projection system 21 with the optical unit, for example the headlamp optical unit for a motor vehicle headlamp, can also have a more compact design, i.e. be lighter and/or more cost-effective, because non-coherent light is produced only in the converter element 20, i.e. the etendue (the product of beam divergence and beam area) is small. The optical efficiency, that is to say the ratio of light produced to light yield on the road, for laser light is high with typically 70 percent compared to light-emitting diodes with approx. 40 percent and xenon with only approx. 30 percent. The more strongly focused laser light thus permits a higher light output and consequently a longer range, and also smaller optical systems and headlamp housings.

The basic concept is once again summarized below. It consists of two primarily important elements:

a) coherent light and its properties are used to produce the light points on the mirror, b) any phosphor, i.e. a phosphor-containing converter element, is only situated downstream in the beam path, because it destroys the coherence of the light. As a result, beam-shaping is no longer possible that easily; a spherical wave is formed at that point, as opposed to a beam.

The beam-shaping element 17 utilizes the properties of the coherent light. What is primarily important here is the beam-shaping element 17 and the order in the beam passage or in the beam path. What matters is to arrange a converter element (phosphor) in the beam path downstream of the beam-shaping element 17 and the micromirror array 18.

The invention consequently makes possible optimum utilization of a digital micromirror array.

The following is a summary list of reference numerals and the corresponding structure used in the above description of the invention:

10 projection apparatus
10' housing
11 surrounding area
12 illumination pattern
13 projection surface
14 pixel
15 laser light source
16 laser
17 beam-shaping element
18 micromirror array
19 mirror
20 converter element
21 projection system
22 laser light
23 partial beam
24 converter layer
25 luminous point
26 reflector
27 light
28 side
29 side
30 back-reflection apparatus
31 light beam
32 laser light
33 edge length
34 gap
35 light point
36 dot pattern
37 position
38 bright position
39 dark position
40 absorber

The invention claimed is:

1. A projection apparatus for producing a pixel-based illumination pattern, the projection apparatus comprising:

a micromirror array having a multiplicity of mirrors, said mirrors being configured for controlling a position thereof for setting a brightness and/or color of a respective pixel of the pixel-based illumination pattern;

a laser light source for producing coherent laser light and for emitting the laser light towards said micromirror array; and a beam-shaping element configured to split the laser light from said laser light source into a multiplicity of partial beams, which are each oriented toward one of said mirrors of said micromirror array such that, except for stray radiation, intermediate spaces between said mirrors of said micromirror array are not illuminated by said multiplicity of partial beams.

2. The projection apparatus according to claim 1, wherein said beam-shaping element is configured to produce a dot pattern on said micromirror array by way of the partial beams, with one light point formed on one of said mirrors of said micromirror array and with an irradiance on said mirrors being greater than in an intermediate space between said mirrors.

3. The projection apparatus according to claim 1, wherein a space between a laser of said laser light source and said beam-shaping element is sealed to be dust-tight or air-tight.

4. The projection apparatus according to claim 1, wherein said beam-shaping element is integrated into said laser light source.

5. The projection apparatus according to claim 1, wherein said beam-shaping element for splitting the laser light into the partial beams has at least one of a photonic crystal or an optical grating.

6. The projection apparatus according to claim 1, wherein said beam-shaping element has an optical divergence structure for diverging at least one of the laser light or the partial beams.

7. The projection apparatus according to claim 1, wherein said laser light source is configured to produce monochromatic laser light, and said mirrors of said micromirror array are Bragg gratings.

8. The projection apparatus according to claim 1, which comprises a converter element disposed in a beam path downstream of said micromirror array and configured to convert a laser light reflected by said micromirror array into light of a different color and/or white light, wherein said micromirror array is configured to use said mirrors to produce, by reflection of the partial beams, mutually independent luminous points on said converter element each belonging to a respective one of the pixels of the illumination pattern.

9. The projection apparatus according to claim 8, wherein said converter element has phosphor for converting the laser light.

10. The projection apparatus according to claim 8, wherein said converter element has a converter layer that is arranged on a reflector, and wherein said reflector has a metal layer that is coupled to a cooling device of the projection apparatus.

11. The projection apparatus according to claim 1, wherein said laser light source is configured to generate blue laser light.

12. The projection apparatus according to claim 1, which comprises a deflection device configured to deflect laser light from said laser light source that would otherwise travel past said micromirror array onto said micromirror array.

13. The projection apparatus according to claim 12, wherein said deflection device is configured to deflect the laser light only onto respective mirrors of said micromirror array that are located in a predetermined peripheral region outside a center of said micromirror array.

14. The projection apparatus according to claim 1, configured as a headlamp for a motor vehicle.

15. The projection apparatus according to claim 1, configured as a multicolor projector for image production.

16. The projection apparatus according to claim 1, which comprises a converter element disposed in a beam path downstream of said micromirror array and configured to convert a laser light reflected by said micromirror array into light of a different color and/or white light.

* * * * *